Sept. 12, 1933.                A. GRUNY                    1,926,942
                            CULINARY UTENSIL
                          Filed March 4, 1932
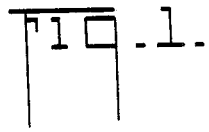
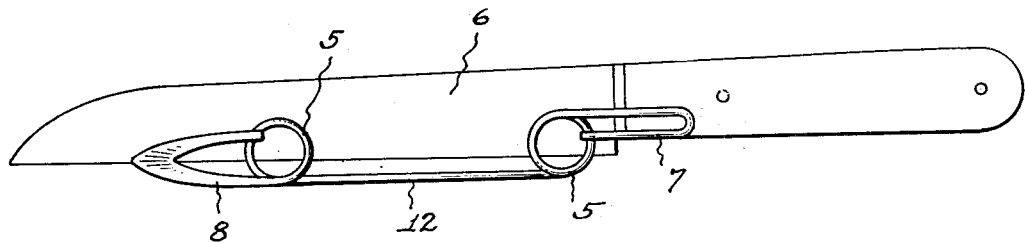
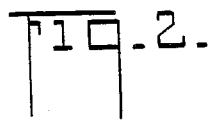
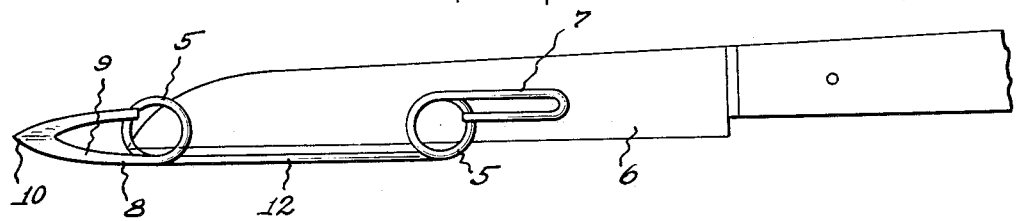
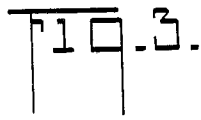
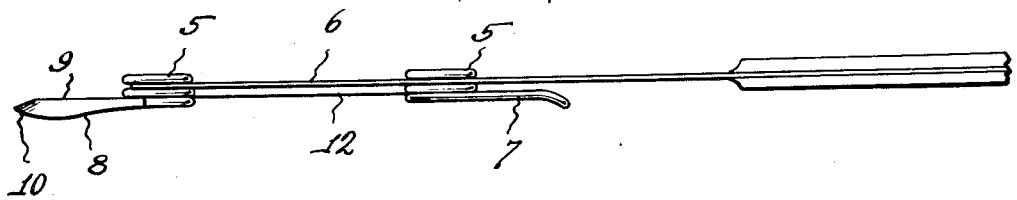
ALBERT GRUNY
        INVENTOR
BY Victor J. Evans & Co.
        ATTORNEY Patented Sept. 12, 1933

1,926,942

UNITED STATES PATENT OFFICE 1,926,942

CULINARY UTENSIL

Albert Gruny, Hawthorne, N. J.

Application March 4, 1932. Serial No. 596,817

1 Claim. (Cl. 146—204)

This invention relates to culinary utensils, and more particularly to one adapted to be readily attached to and detached from a knife and having utility in the peeling of fruits and vegetables, and further in pitting fruits, such as cherries, for example, and in removing the eyes from pineapples, potatoes, etc.

The device of my invention is safe and easy to use and effects economies in time and material in the preparation of foods.

The invention will be fully and comprehensively understood from a consideration of the following detailed description when read in connection with the accompanying drawing which forms part of the application with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claim.

In the drawing:

Fig. 1 is a plan view of a knife to which the device of my invention is attached, the device in this view being shown in retracted position.

Fig. 2 is a view similar to Fig. 1, but shows the device in projected position for operation; and Fig. 3 is a view of the lower side of Fig. 2.

Referring to the drawing for a more detailed description thereof, the device of my invention may be made from a single piece of wire so as to form a pair of double spring loops 5, which receive the knife blade 6, on which blade the device is slidable from retracted to projected position and vice versa. One end of the device is formed into a loop 7 adapted for pitting cherries, for example, this loop projecting back of the rear loop 5.

The device comprises a loop 8 extending forwardly of the front double loop 5. The mentioned loop 8 is adapted for paring or peeling and also for taking the eyes out of pineapples, potatoes, etc., being tapered at its free end for the latter purpose. While the remainder of the device is formed with wire circular in cross-section, the looped portion 8 is flattened and the flattened sides and end thereof are inclined so that the loop has a dished formation. The lower edge 9 of the loop 8 is sharpened so that it may be effective for paring or peeling and the forepart 10 of the upper edge is also sharpened so that it may be effective in removing eyes. The device may be reversed from the position shown in the drawing when it is desired to use the loop 7 for pitting purposes, the latter loop assuming the position of loop 8 in the drawing.

The body portion of the device, or that portion which lies between and connects the spring loops 5, lies to one side of the knife blade 6, as shown in Fig. 3, and functions to limit the cutting depth of the blade in paring operations, when the device is attached to the knife blade, functioning therefore as a guard. When the device is attached to the knife in one position, the guard 12 functions when the paring operation is away from the user and when attached in the reverse position the guard functions when the paring is toward the user.

What is claimed is:

A device of the character described comprising a single piece of metal bent to form spaced knife-blade-receiving loops with a gauge or guard between the loops and adapted to run along the blade in spaced relation thereto, the metal being bent to form an open loop beyond one of the first-mentioned loops and being dished, tapered and having sharpened side edges, the metal being looped beyond the other of the first-mentioned loops to form pitting means.

ALBERT GRUNY.